United States Patent [19]
Kass et al.

[11] Patent Number: 5,992,916
[45] Date of Patent: Nov. 30, 1999

[54] RETAINER FOR TRAILER TAILGATE

[75] Inventors: John J. Kass; Richard W. McCoy, both of Granger, Ind.

[73] Assignee: Reese Products, Inc., Elkhart, Ind.

[21] Appl. No.: 09/019,964

[22] Filed: Feb. 6, 1998

Related U.S. Application Data

[60] Provisional application No. 60/039,323, Feb. 7, 1997.

[51] Int. Cl.⁶ .................................................. B62D 33/037
[52] U.S. Cl. .................................. 296/57.1; 292/DIG. 29
[58] Field of Search ..................... 296/57.1; 292/DIG. 29

[56] References Cited

U.S. PATENT DOCUMENTS

| | | | |
|---|---|---|---|
| 683,020 | 9/1901 | Camp | 292/DIG. 29 |
| 1,510,798 | 10/1924 | Poe | 292/DIG. 29 |
| 2,829,001 | 4/1958 | Leaphart | 296/57.1 |
| 4,472,639 | 9/1984 | Bianchi | 296/57.1 |
| 5,685,594 | 11/1997 | Harper | 296/57.1 |
| 5,755,480 | 5/1998 | Bryan | 296/57.1 |

*Primary Examiner*—Gary C. Hoge
*Attorney, Agent, or Firm*—King and Schickli

[57] ABSTRACT

A relatively inexpensive and reliable latching mechanism for locking or otherwise securing a tailgate to the cargo area of a vehicle or trailer is provided comprised of a latch plate of unitary construction and a locking pin. The latch plate is further comprised of a mounting base having means for attachment to the vehicle or trailer sidewall and an offset projecting lug having a lanced tab for receiving the locking pin. In a preferred embodiment, the mounting base is attached to the vehicle side wall and the lanced tab projects through a complimentary closed slot in the tailgate and receives the locking pin thereby securing the tailgate between the offset, the projecting lug and the lanced tab. The offset projecting lug creates a space between the vehicle side wall and the projecting lug which traps a portion of the tailgate which forms the closed slot therebetween to add additional strength and stability to the attachment.

6 Claims, 2 Drawing Sheets

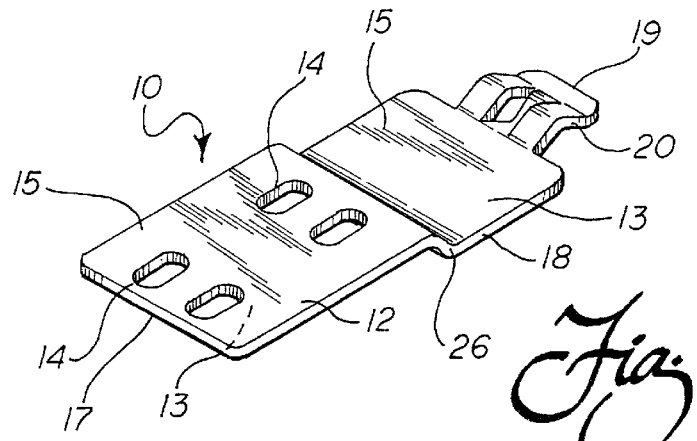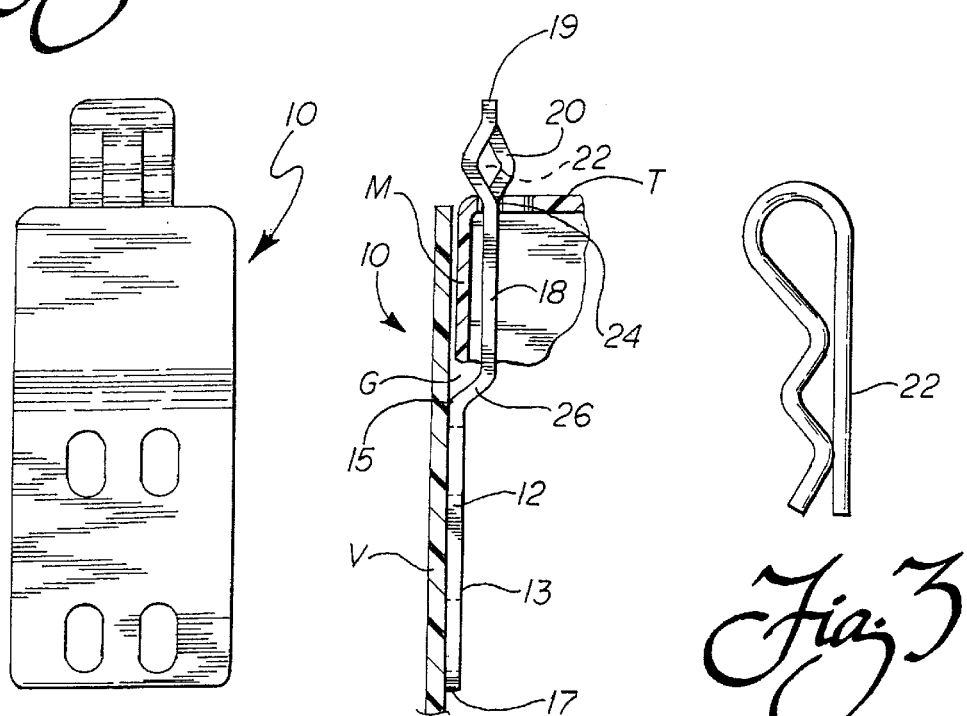

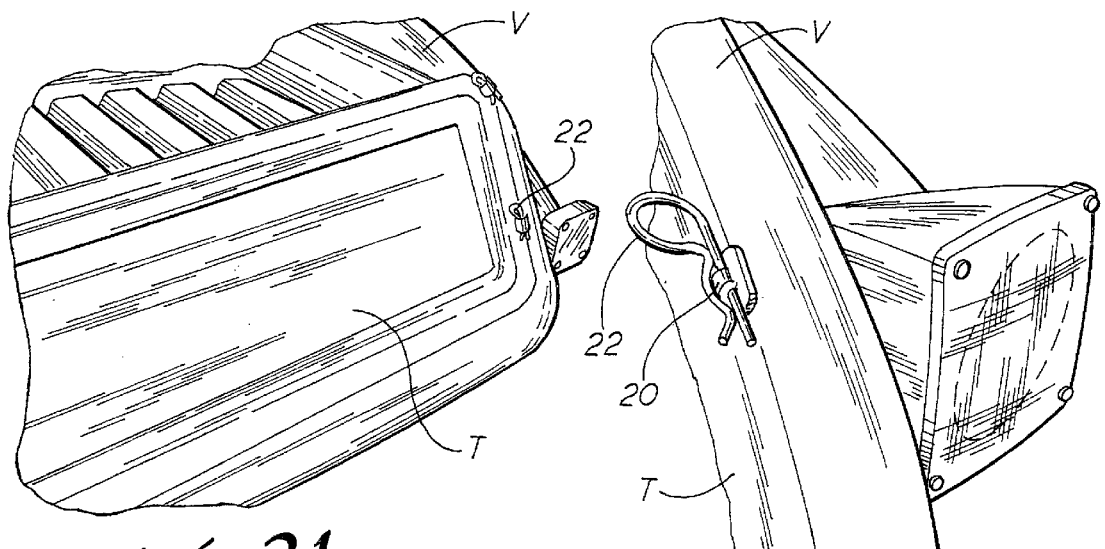
Fig. 4
Fig. 7
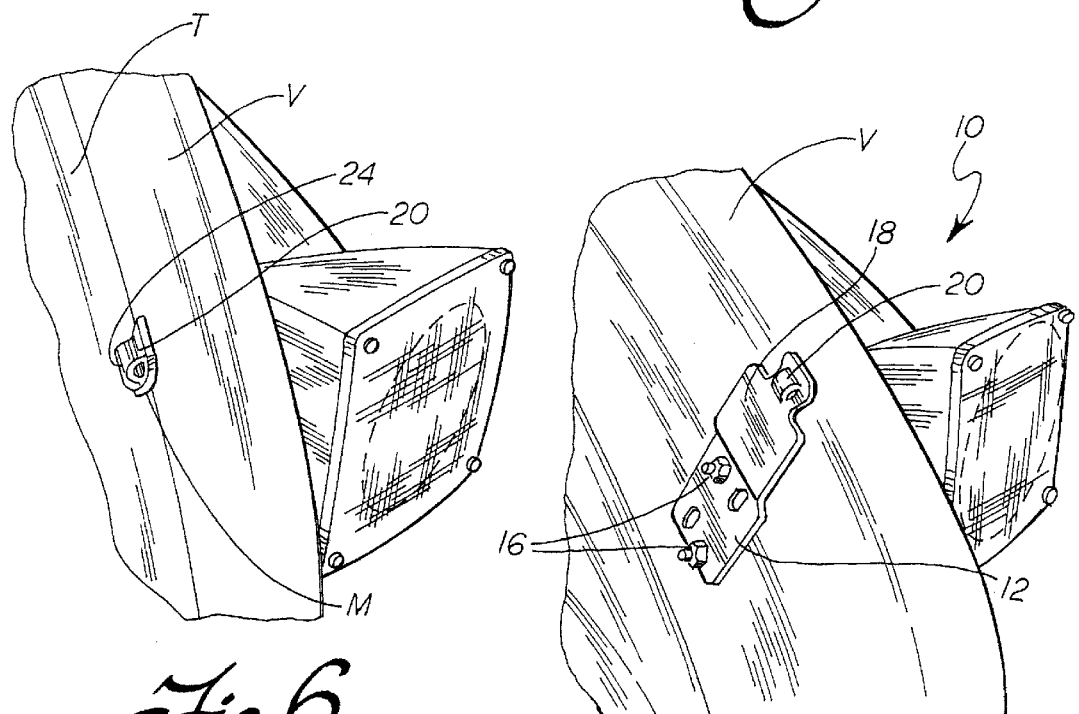
Fig. 6
Fig. 5

RETAINER FOR TRAILER TAILGATE

This patent application claims the benefit of priority as hereby claimed on U.S. Provisional Patent Application Ser. No. 60/039,323, filed Feb. 7, 1997, entitled "Retainer for Trailer Tailgate".

TECHNICAL FIELD

The present invention relates generally to the vehicle equipment field and, more particularly, to a tailgate latching mechanism for locking a trailer or truck tailgate in a closed position.

BACKGROUND OF THE INVENTION

Latching mechanisms for attaching a tailgate to a utility trailer or to the cargo bed of a pickup truck are known in the art. Many elaborate and expensive systems which include a hinged attachment along one border of the tailgate and a separate locking mechanism are prevalent in the industry as seen with the standard tailgate of a pickup truck, e.g, a Ford or General Motors product.

Often times when removal of the tailgate is desired the hinged portion must be manually disconnected leaving exposed hardware attached to the cargo body which interferes with substantially unobstructed access to the cargo area. Likewise, there may be hardware associated with the hinges or the latching mechanism which remains attached to the tailgate which interferes with convenient storage. This is especially true with the tailgate assembly of many commercially available utility trailers Accordingly, there exists a need in the art for a reliable, inexpensive latching mechanism which allows for quick attachment and removal of the tailgate that does not require the removal of hardware which otherwise protrudes into or obstructs access to the cargo area.

SUMMARY OF THE INVENTION

It is a primary object of the present invention to provide a relatively inexpensive and reliable latching mechanism for securing a tailgate to a vehicle such as a utility trailer or pickup truck.

Another object of the present invention is to provide a novel and unique method of securing a tailgate to a trailer.

Yet another object of the invention is to provide a safer and more functional latching mechanism for securing a tailgate to a vehicle or trailer that is substantially devoid of hinged or moving parts attached to the vehicle which could interfere with or impede an unobstructed access to the cargo area when the tailgate is open or removed.

A further object of the invention is to provide a safer and more functional latching mechanism for securing a tailgate to a vehicle or trailer that is substantially devoid of hinged or moving parts attached to the tailgate which could become damaged or cause damage when the tailgate is removed from the vehicle and stored.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a latching mechanism is provided for locking a tailgate to a vehicle such as a trailer. The latching mechanism includes a latch plate having a projecting lug. Additionally, the locking mechanism includes a means for mounting the latch plate to either the tailgate or the vehicle. A slot is provided in the other of the tailgate or the vehicle for receiving the projecting lug. Finally, the latching mechanism includes a pin that is selectively received in the projecting lug for securing the tailgate onto the vehicle.

Preferably, the projecting lug carries an expanded, lanced tab adapted to receive the pin. Additionally, the projecting lug is preferably offset so that the slot may be provided through the tailgate or vehicle in order to provide a secure and reliable connection in a manner described in greater detail below, Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing FIG. 1 is a perspective view of the latch plate;

FIG. 2 is a plan view of the latch plate;

FIG. 3 is a side elevational or edge view of the latch plate showing the offset and pin receiving expanded, lanced tab;

FIG. 3a is a plane view of the spring clip or pin used to secure the tailgate into position;

FIG. 4 is a perspective view showing a tailgate secured to the body of a trailer;

FIG. 5 is a detailed perspective view showing the latch plate secured to the sidewall of the trailer;

FIG. 6 is a detailed perspective view showing the tailgate positioned on the trailer with the projecting lug received in the slot in the tailgate and the lanced tab extending outwardly from the slot; and FIG. 7 shows the tailgate secured in position with the pin received in the lanced tab.

Reference will now be made in detail to the present preferred embodiment of the invention, an example of which is illustrated in the accompanying drawing.

DETAILED DESCRIPTION OF THE INVENTION

Reference is now made to FIGS. 1–3 showing a latch plate, generally designated by reference numeral 10. The latch plate 10 is preferably integrally formed from a single piece of stamped steel or other high strength metal, however, it can be appreciated that other materials such as high impact plastic can be utilized.

The latch plate 10 is comprised of a medial surface 13, an opposite lateral surface 15, a proximal end 17 and an opposed distal end 19. The proximal end 17 of latch plate 10 is further defined by a mounting base 12 including a series of apertures 14 extending through the medial and lateral surfaces 13, 15 for receiving fasteners such as the cooperating bolts and lock nuts 16 shown in FIG. 5 used to secure the latch plate 10 to the sidewall of the trailer V.

The embodiment shown in FIGS. 1–2 shows a rectangular arrangement of four ovoid apertures 14 for attachment of mounting base 12 to the sidewall of a trailer, however, the skilled artisan can appreciate that many other aperture configurations and arrangements are available and known in the art. It is also contemplated that other means for attachment of the mounting base to the sidewall of the trailer or cargo area are possible depending upon the choice of materials including, but not limited to welding and the like.

As further shown, the latch plate 10 includes a projecting lug 18 which projects from the mounting base 12 toward distal end 19. A shoulder 26 which is defined by the offset lies between the mounting base 12 and projecting lug 18.

The projecting lug 18 carries an expanded lanced tab 20 adjacent the distal end 19 adapted to receive a connecting clip or pin 22 shown in FIG. 3a in a manner well known in the art. As shown in FIG. 4, the latch plate 10 is a part of a latching mechanism particularly useful for locking or securing a tailgate T to a vehicle such as a trailer V. As can further be appreciated, other than the connecting clip may be used to lock or secure the attachment of the tailgate, e.g., a padlock may be utilized to prevent access to an enclosed cargo area.

As best shown in FIG. 5, the latch plate 10 may be mounted to the sidewall of the vehicle V by means of cooperating bolt and lock nut fasteners 16 received through the apertures 14 in the mounting base 12. The latch plate 10 is mounted with the lateral surface 15 of mounting base 12 flush with the sidewall of the trailer V so that the offset provides a space or gap between the vehicle sidewall and the lateral surface 15 of projecting lug 18.

As shown in FIG. 6, the tailgate T includes a slot 24 that is sized to receive the projecting lug 18. Preferably, the tailgate T defines a closed slot 24 with the gap G between the projecting lug 18 and the sidewall of the trailer V providing the necessary clearance for the margin M of the tailgate T defining the outermost wall of the slot. This closed slot construction provides additional strength to the connection. When the tailgate T is fully seated on the vehicle V, the expanded, lanced tab 20 extends or projects outwardly from the tailgate slot 24.

As shown in FIG. 7, the pin 22 may then be inserted into the expanded, lanced tab 20 so that the tailgate T is secured in position on the trailer V by the receipt of the slot 24 over the projecting lug 18 and the resulting capture of the tailgate on the projecting lug between the pin 22 and the shoulder 26 defined by the offset which integrally connects the projecting lug with the mounting base 12.

In summary, numerous benefits results from employing the concepts of the present invention. The latching mechanisn provides a relatively secure and inexpensive means for reliably locking a tailgate T to a vehicle such as a trailer V. The assembly and connection may be conveniently completed with minimal time and effort. The expanded lanced tab 20 of the latch plate 10 allows the associated connecting pin 22 to be parallel with the sides of the trailer V leaving the upper edge and margin of the trailer clear to receive a top without interference. Likewise, the single piece construction of latch plate 10 and its low profile attachment to the vehicle or trailer sidewall provide substantially unobstructed access to the cargo area through the tailgate opening when the tailgate is removed. There are no moving or protruding parts to interfere with loading or unloading of cargo and no dissembly is required to remove the tailgate other than removal of pin 22.

The foregoing description of a preferred embodiment of the invention has been presented for purposes of illustration and description. It is not intended to be exhaustive or to limit the invention to the precise form disclosed. Obvious modifications or variations are possible in light of the above teachings. While the illustrations in FIGS. 4–7 show the latch plate 10 mounted to the vehicle V and the provision of a cooperating slot in the tailgate T, the construction may, of course; be reversed with the latch plate connected to the tailgate T and the slot being provided in the vehicle V. Further, while two latching mechanisms are shown in drawing FIG. 7 at each side of the trailer V, it should be appreciated that any number may be provided depending upon the particular application.

The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. A latching mechanism for attaching a tailgate to a vehicle comprising:

a latch plate including a projecting lug carrying an expanded lanced tab;

means for mounting said latch plate to one of said tailgate and said vehicle;

a slot in the other of said tailgate and said vehicle for receiving said projecting lug; and a pin selectively received in said expanded lanced tab of said projecting lug for securing said tailgate to said vehicle.

2. The latching mechanism of claim 1 wherein said projecting lug is offset.

3. The latching mechanism of claim 1, wherein said projecting lug further comprises a lanced tab extending from said distal end for receiving said pin.

4. The latching mechanism of claim 1, wherein said latch plate further comprises a medial surface and an opposite lateral surface such that when said latch plate is attached to a selected one of said tailgate or said vehicle said offset provides a space between said tailgate or said vehicle and said lateral surface of said projecting lug.

5. A latching mechanism for attaching a tailgate to a vehicle comprising:

a latch plate including a projecting lug;

means for mounting said latch plate to one of said tailgate and said vehicle;

a slot in the other of said tailgate and said vehicle for receiving said projecting lug; and a pin selectively received in said projecting lug for securing said tailgate to said vehicle;

said latching mechanism being characterized by said latch plate further including a mounting base and said mounting means being a series of apertures through said mounting base for receiving a complimentary fastener such as a cooperating bolt for attaching said mounting base to a selected one of said tailgate and said vehicle.

6. A latching mechanism for attaching a tailgate to a vehicle comprising:

a latch plate including an offset projecting lug;

means for mounting said latch plate to one of said tailgate and said vehicle;

a slot in the other of said tailgate and said vehicle for receiving said projecting lug; and a pin selectively received in said projecting lug for securing said tailgate to said vehicle;

said latching mechanism being further characterized by said latch plate including a proximal end and an opposite distal end with a mounting base adjacent said proximal end thereof, wherein said offset defines a shoulder between said mounting base and said projecting lug which is adjacent said distal end.

* * * * *